June 2, 1931.  G. W. ELSEY ET AL  1,807,653
SHOCK ABSORBER
Filed March 29, 1929   2 Sheets-Sheet 1

Inventor
William A. Chryst
George W. Elsey
By Spencer, Hardman and Fehr
Attorneys

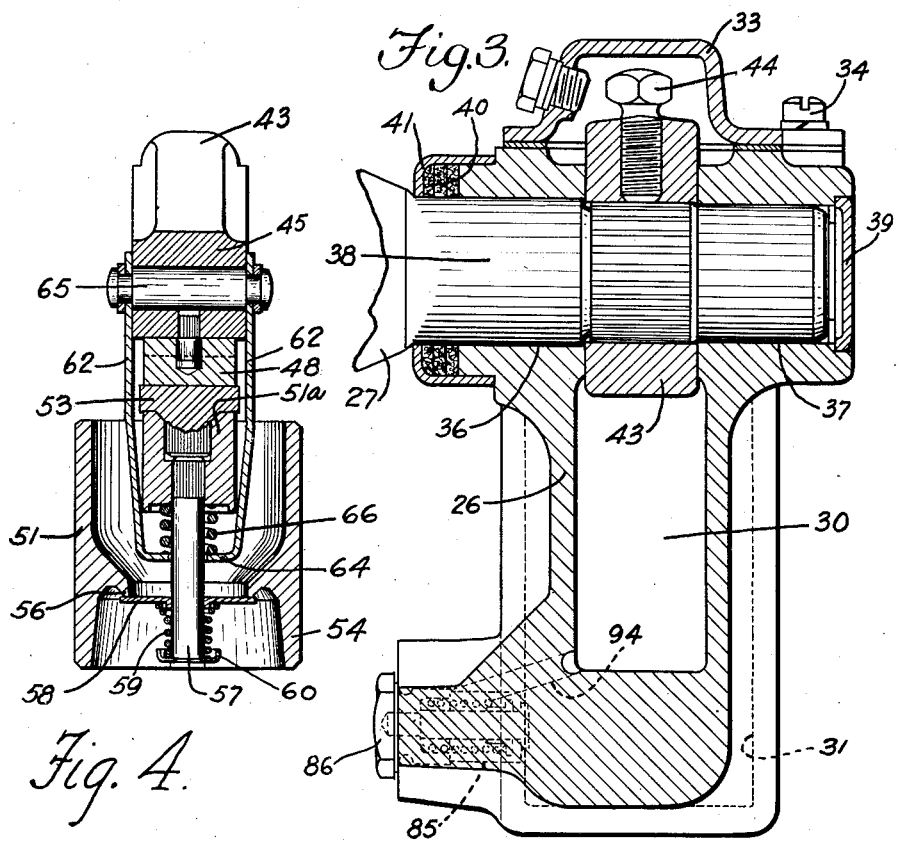
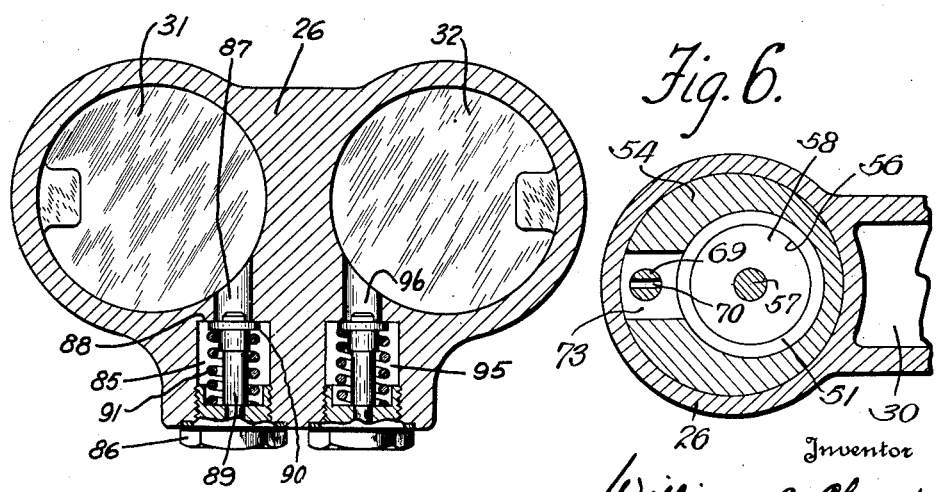

Patented June 2, 1931

1,807,653

UNITED STATES PATENT OFFICE

GEORGE W. ELSEY AND WILLIAM A. CHRYST, OF DAYTON, OHIO, ASSIGNORS TO DELCO PRODUCTS CORPORATION, OF DAYTON, OHIO, A CORPORATION OF DELAWARE

SHOCK ABSORBER

Application filed March 29, 1929. Serial No. 351,036.

This invention relates to improvements in shock absorbers, particularly adapted to cushion the movement of two relatively movable members, for example, the frame and axle of a vehicle.

It is among the objects of the present invention to provide a shock absorber adapted to resist both the approaching and separating movements of the frame and axle of a vehicle for purposes of dissipating road shocks and preventing transmission of such shocks to the vehicle frame.

Further objects and advantages of the present invention will be apparent from the following description, reference being had to the accompanying drawings wherein a preferred embodiment of one form of the present invention is clearly shown.

In the drawings:

Fig. 3 is a section taken along the line 3—3 of Fig. 2.

Fig. 4 is a sectional view taken along the line 4—4 of Fig. 2.

Fig. 5 is a section taken along the line 5—5 of Fig. 2.

Fig. 6 is a detail, cross-sectional view taken substantially along the line 6—6 of Fig. 2.

Figure 1:
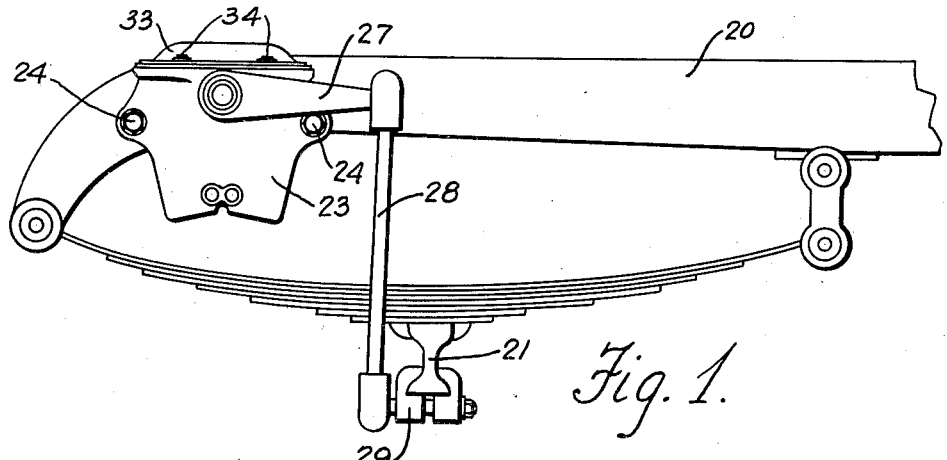
Fig. 1 illustrates a front portion of the frame of an automotive vehicle supported by springs upon the usual axle, the shock absorber embodying the present invention being shown applied thereto.

Referring to the drawings, one of the relatively movable members is the frame of the vehicle designated by the numeral 20. The other relatively movable member is the axle 21 upon which the vehicle springs 22 (one of which is shown) are supported, said springs in turn supporting the frame 20. The shock absorber designated as a whole by the numeral 23, is secured to the frame 20 by means of studs 24 which extend through apertured lugs 25 provided on the casing 26 of the shock absorber. The shock absorber 23 has an operating arm 27, to be detailedly described hereinafter, the free end of said operating arm being secured to one end of the link 28, the other end of said link being attached to the axle 21 by a clamping bracket 29.

Figure 2:
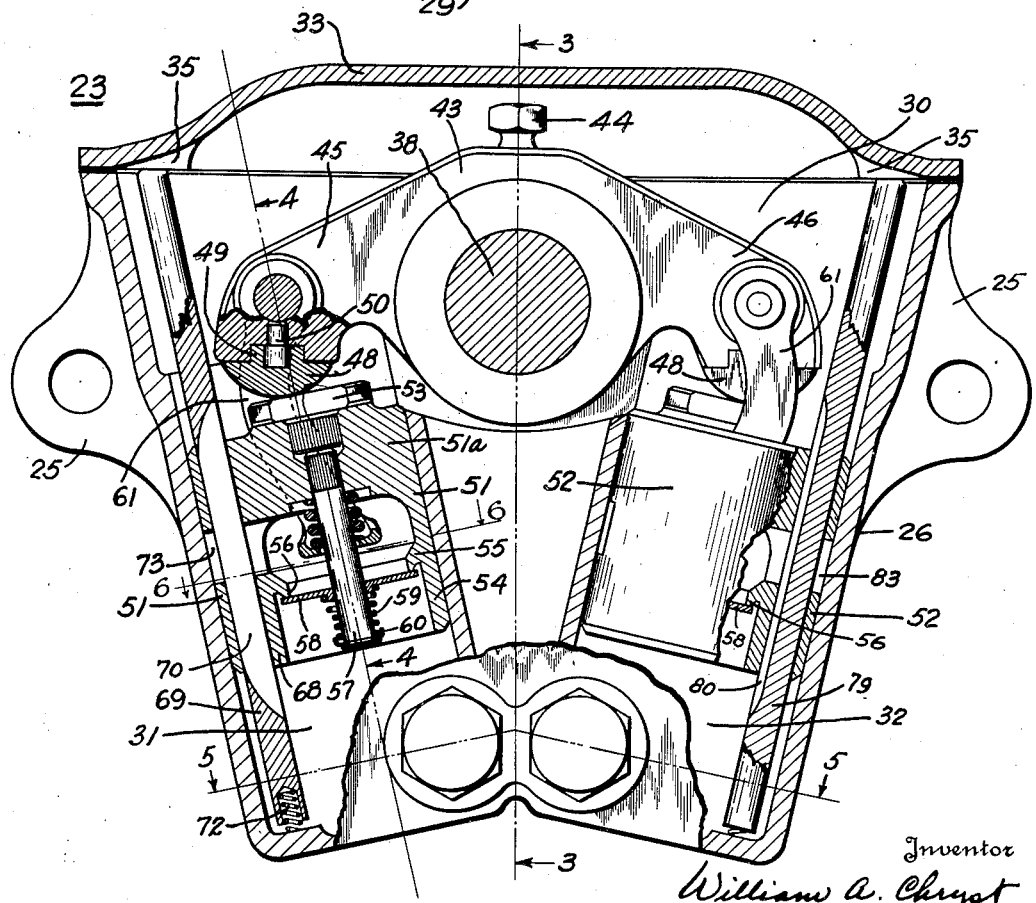
Fig. 2 is a sectional view taken through the shock absorber, certain parts being shown in elevation more clearly to define the structure.

The shock absorber 23 comprises a casing 26 presenting a fluid reservoir 30 and two cylinders 31 and 32. In Fig. 2 the cylinders are shown arranged in V formation, that is, their axes converge. At one end the cylinders are closed, while the opposite ends of the cylinders open into the fluid reservoir 30. A cover 33 is attached to the casing 26 by screws 34. This cover is provided at each end with a lug 35 for purposes to be described.

The casing presents two coaxial bearing portions 36 and 37 in which the rocker shaft 38, shown in the present drawings to be formed integral with the operating arm 27, is journalled. The open end of the bearing 37, or more specifically its outside end, is closed tightly, substantially to prevent oil leaks, by the disc 39. Fluid is prevented from leaking along the bearing portion 36 by a packing which comprises packing elements 40 urged into sealing engagement with the rocker shaft 38 and the outside edge of the casing 26 surrounding said shaft by the packing gland 41. Within the fluid reservoir portion 30 of the casing the rocker-shaft 38 is provided with knurls upon which the rocker-lever 43 fits, a set screw 44 in the rocker-lever assisting in securing said rocker-lever upon the rock-shaft 38. The rock-lever 43 has oppositely disposed arm portions 45 and 46 as shown in the Fig. 2. The arm 45 of the rocker-lever 43 lies substantially in alignment with the cylinder 31, while arm 46 of the lever 43 lies substantially in alignment with the cylinder 32. The end of each arm 45 and 46 of lever 43 is provided with a wear-piece 48 of any suitable wear resisting material such as hardened steel or the like. The wear-pieces are secured to their respective arm ends in any suitable manner. In the present case the wear-piece is shown having an extension 49 fitting into a recess in the lever, a pin 50 anchoring the wear-piece to the lever.

In each cylinder 31 and 32 respectively there is provided a piston. The piston of cylinder 31 is designated by the numeral 51, and the piston of cylinder 32 is designated by the numeral 52. Inasmuch as both of these pistons are exactly alike, only one of them, the piston 51, will detailedly be described.

The piston comprises a head portion 51a having a central bore, the one end of which receives the shank portion of the head-piece 53. This head-piece rests upon the upper surface of the piston head portion 52 and is made of any suitable wear resisting material. The piston 51 has a skirt portion 54 provided with an inwardly extending, annular flange 55 having an annular ridge 56 which forms a valve seat. In the bore of the piston head portion 51a there is secured a valve-stem 57 substantially coaxial of the annular flange 55. A valve 58 is slidably supported on the valve-stem 57, a spring 59 interposed between the valve 58 and a retainer collar 60 normally urging the valve 58 into engagement with the valve-seat 56. The retainer collar 60 is supported within an annular groove provided adjacent the outer end of the valve-stem 57.

The piston is suspended from or attached to the arm 45 of the rocker-lever by a U-shaped link 61 comprising two, substantially parallel arm portions 62 and a cup-shaped web 64. This is clearly illustrated in the Fig. 4. The link 61 has its arms 62 pivotally attached to the pin 65 which is carried in the end of the arm 45 of the rocker-lever. The cup-shaped web 64 is apertured, the valve-stem 57 extending through said aperture, as illustrated in the Figs. 2 and 4. A spring 66 surrounds the valve pin 67 and is interposed between the web 64 and the piston head portion 51a, said spring normally urging the piston head-piece 53 into engagement with the wear-piece 48. Spring 66 is adapted to be compressed if for any reason the piston 51 should happen to stick in the cylinder 31 when the arm 45 is pulling it away from the bottom of its cylinder, or more specifically when the arm 45 is moving the piston 51 through its suction stroke.

Piston 51 has an offset lug 68 substantially the length of said piston, said lug in turn having a longitudinal passage therethrough through which the metering pin 69 extends. As shown in the Fig. 2, the metering pin 69 of the piston 51 is provided with a slot 70 so constructed and arranged relative to the normal position of the piston 51, in which position it is shown in the Fig. 2, that communication is provided through the slot 70 in the metering pin 69, between the compression chamber in the cylinder 31 beneath the piston 51 and the fluid reservoir 30. This communication, however, is adapted to be destroyed by the movement of the piston one way or the other beyond the confines of the slot 70. By referring to Fig. 2 it may be seen that the upper end of the metering pin 69 abuts aganst the abutment lug 35 provided on the cover 33 so that metering pin 69 may not move upwardly, or more specifically in the direction of the movement of the piston as it moves through its suction stroke. At the opposite end of the metering pin 69 there is provided a recess containing a spring 72 which yieldably supports the metering pin upon the bottom of the cylinder 31 so that, if necessary, the metering pin may move downwardly or in the same direction as the piston when said piston is moving to its compression stroke. A passage 73 is provided in the side of the piston, providing communication between the slot 70 of the metering pin and the interior of the piston, or more specifically, the interior of the piston above the intake-valve 58.

The metering pin 79 of cylinder 32 and piston 52 differs from the metering pin 69 of the cylinder 31 in that no slot 70 is provided in this metering pin, but a recess or groove 80 is provided, which is in communication with the passage 83 formed in the side of the piston and corresponding to the passage 73 of the piston 51.

It has been found that covering or plating the surfaces of the rocker-arm head-pieces 48 and the piston wear-pieces 53 with any suitable ductile metal having lubricating qualities, such as copper or the like, substantially facilitates the wearing in of these two pieces and practically eliminates galding.

Each cylinder 31 and 32 is provided with a separate pressure-release valve whereby fluid escape from these respective cylinders is provided for when the fluid pressure reaches a predetermined value in either one of the cylinders.

Cylinder 31, as shown in the Fig. 5, is provided with a check valve substantially like the cylinder 32, so only one of these check valves will be described.

In the casing 26 there are provided two recesses 85 and 95 having screw threads at the outer ends for receiving the screw plugs 86. A passage 87 provides communication between the recess 85 and the cylinder 31, the passage 87 being of lesser transverse dimensions than the recess 85, thereby providing a valve-seat 88. Screw plug 86 supports a valve pin 89 substantially coaxial of the recess 85. Upon the valve stem 89 a valve 90 is slidably supported, said valve being maintained normally in engagement with the valve-seat 88 to shut off communication between the piston 31 and the recess 85, by a spring 91 interposed between the valve 90 and the screw plug 86. In the Fig. 3 it may be seen that the recess 85 is in communication with the fluid reservoir or chamber 30 through the duct or passage 94 shown in dotted lines. The recess 95 in communication with the cylinder 32 through passage 96 is also in communication with the fluid reservoir or chamber 30 through a passage similar to the passage 94, so that, in any case in which the fluid pressure opens one of the fluid pressure-release valves, fluid from the respective cylinder may flow from the cylinder into its respective recess 85 or 95 and thence into the fluid chamber or reservoir 30 through the respective passages 94.

The device operates as follows:

When the road wheels of the vehicle (which road wheels are not shown on the drawings but are supported on the axle 21) strike an obstruction in the roadway, springs 22 will be flexed upwardly toward the frame 20, such movement causing the link 28 to operate the shock absorber operating arm 27 in a counter-clockwise direction, resulting in a counter-clockwise rotation of the rocker-shaft 38 and consequently a counter-clockwise rotation of the rocker-lever 43. This movement causes the rocker-lever to move piston 51 downwardly into its cylinder and to move the piston 52 upwardly in its cylinder. As the piston 52 is so moved, its valve 58 will be moved from the valve-seat 56 to open the passage through the piston, and thus will be established a substantially free flow of fluid from the fluid reservoir 30 into the compression chamber of the cylinder 32.

As has been mentioned before, counter-clockwise movement of the rocker-lever 43 pushes piston 51 downwardly into its cylinder 31 so that, fluid will assist spring 59 in pushing valve 58 tightly against its valve-seat 56. Within a predetermined range fluid will flow from the compression chamber of cylinder 31 through the slot 70 in the metering pin 69 back to the fluid reservoir 30. As the piston 51 moves downwardly over the metering pin 69, the entrance port provided between the bottom of the slot 70 and the piston 51 will gradually be decreased so that the restriction to the flow of fluid through the metering pin slot 70 will gradually, increasingly, be restricted, and thus the movement of the piston downwardly will be resisted increasingly. If, upon continued movement of the piston 51 downwardly, the fluid pressure in the cylinder 31 exceeds a predetermined value, said pressure will be exerted through passage 87 upon the valve 90, causing said valve to be moved against the effect of spring 91 to open communication between the passage 87 and the recess 85, which, as has been mentioned heretofore, is in communication with the fluid reservoir or chamber 30 through the passage 94 shown in dotted lines in Fig. 3. Thus, at a predetermined pressure, a communication is completed between the cylinder 31 and the fluid reservoir or chamber 30 through the passages of the fluid pressure-release valve.

As soon as the springs 22 have reached the limit of their flexure, caused by the obstruction met, the tendency thereof will be to return to the normal unflexed position with a sudden, rebounding movement, which, if permitted, would result in a rebounding shock being transmitted to the frame of the vehicle. In order to avoid such a rebound shock, the present shock absorber checks the return of the spring. As the spring 22 starts to return to unflexed position, link 28 will rotate the shock absorber operating arm 27 in a clockwise direction and thus a consequent clockwise rotation of the rocker-lever 43 obtains. Now piston 51 is being moved upwardly toward the open end of its cylinder and, the fluid in the fluid reservoir 30 will move valve 58 to establish a substantially free flow of fluid into the cylinder or compression chamber beneath the piston 51. At the same time the piston 52 is moved from its upper position, which position is above that shown in the Fig. 2, and fluid beneath said piston 52 will have pressure exerted thereon. As soon as the head of piston 52 passes the upper confines of the groove 80, a restricted flow of fluid is established from the compression chamber of cylinder 32 through the groove 80 of its metering pin 70. This restricted flow of fluid from the compression chamber of cylinder 32 resists the downward movement of the piston 52 and thus the return of spring 22 toward its unflexed position is comparatively resisted. If, the fluid pressure within cylinder 32 exceeds a predetermined value, then, like its associate piston 51, piston 52 will cause fluid pressure to be exerted upon the fluid pressure release valve which opens communication between the cylinder 32 and the fluid reservoir or chamber 30 by opening the valve to connect passage 96 with the recess 95.

The degree of resistance to the movement of the pistons 51 and 52 downwardly may be varied by changing the characteristics of the metering pins 69 and 79 respectively, that is changing the size of their respective slots and grooves or the springs 91 of their respective pressure release valves may be decreased or increased to obtain a suitable resistance.

Both pistons 51 and 52 are suspended from the rocker lever 43 by a link which is adapted yieldably to maintain the piston in engagement with the respective arms of the rocker-lever so that quiet operation of the device obtains, said yieldable suspension, however, providing for relative movement between the pistons and the rocker-lever if friction or binding tends to prevent movement of the pistons.

The metering pins are supported so that they may adjust themselves laterally, longitudinal movement of said metering pins being permissible in one direction only, and that, in the direction of the pistons on their compression strokes, in which instance the force of pressure tends to move the metering pins upward against the abutment blocks 35 on the cover 33 with which the upper ends of said metering pins engage.

Each cylinder is provided with its own pressure release valve so that, if necessary, or if so desired, the pressure release of the two cylinders may be varied, one operating or relieving at a greater pressure than the other, and thus one offering greater resistance to the movement of the spring 22 than the other.

Applicant has provided a coating on the wear-pieces of his rocker-lever and pistons of any suitable ductile, lubricating metal which, facilitates the wearing in of these parts, the lubricating qualities of the metal substantially preventing galding of the wear-pieces.

While the form of embodiment of the present invention as herein disclosed, constitutes a preferred form, it is to be understood that other forms might be adopted, all coming within the scope of the present invention.

What is claimed is as follows:

1. A shock absorber comprising in combination, a casing presenting a fluid chamber and a cylinder, an oscillatable lever supported within the fluid chamber, a link attached to the oscillatable lever, a resilient member on link, and a piston in the cylinder, yieldably clamped between the resilient member and the oscillatable lever.

2. A shock absorber comprising in combination, a casing presenting a fluid chamber and a cylinder, a piston in the cylinder, an oscillatable lever supported within the fluid chamber, a U-shaped link pivotally secured to the oscillatable lever and having portions thereof extending into the piston, and a coil spring interposed between the link and piston.

3. A shock absorber comprising in combination, a casing presenting a fluid chamber and a cylinder, a piston in the cylinder, said piston having a head portion, an oscillatable lever supported within the fluid chamber, the free end of said lever being adapted to engage the piston head to move the piston in one direction, a link connecting the piston to the free end of said lever so that the lever is adapted to operate the piston in the other direction, and a resilient member interposed between the link and piston adapted yieldably to maintain the piston head in engagement with the free end of the oscillatable lever.

4. A shock absorber comprising in combination, a casing presenting a fluid chamber and a cylinder, a piston in the cylinder, said piston having a head portion, an oscillatable lever supported within the fluid chamber, the free end of said lever being adapted to engage the piston head to move the piston in one direction, a link connecting the piston to the free end of said lever so that the lever is adapted to operate the piston in the other direction, and a coil spring interposed between the link and piston adapted yieldably to maintain the piston head in engagement with the free end of the oscillatable lever.

5. A shock absorber comprising in combination, a casing presenting a fluid chamber and a cylinder; a piston in said cylnder; an oscillatable lever in the fluid chamber, adapted to operate the piston; a passage in the piston providing for the transfer of fluid from one side of the piston to the other in response to the movement of said piston in one direction, said passage presenting an annular valve seat; a valve stem carried by the piston substantially coaxial of the annular valve seat; a valve slidably supported on the valve stem and adapted to engage the valve seat to close the piston passage in response to the movement of the piston in the other direction; and a link having one end attached to the oscillatable lever, the other end being operatively connected with the valve stem.

6. A shock absorber comprising in combination, a casing presenting a fluid chamber and a cylinder; a piston in said cylinder; an oscillatable lever in the fluid chamber, adapted to operate the piston; a passage in the piston providing for the transfer of fluid from one side of the piston to the other in response to the movement of said piston in one direction, said passage presenting an annular valve-seat; a valve stem carried by the piston substantially coaxial of the annular valve seat; a valve slidably supported on the valve stem and adapted to engage the valve seat to close the piston passage in response to the movement of the piston in the other direction; a link having one end anchored to the oscillatable lever, the other end being slidably attached to the valve pin; and a resilient member interposed between the piston and the end of the link attached to the valve pin.

7. A shock absorber comprising in combination, a casing presenting a fluid chamber and a cylinder; a piston in said cylinder; an oscillatable lever in the fluid chamber, adapted to operate the piston; a passage in the piston providing for the transfer of fluid from one side of the piston to the other in response to the movement of said piston in one direction, said passage presenting an annular valve seat; a valve stem carried by the piston substantially coaxial of the annular valve seat; a valve slidably supported on the valve stem and adapted to engage the valve seat to close the piston passage in response to the movement of the piston in the other direction; a link having one end anchored to the oscillatable lever, the other end being slidably attached to the valve pin; and a coil spring surrounding the valve pin and interposed between the piston and link.

8. A shock absorber comprising in combination, a casing presenting a fluid chamber and a cylinder; a piston in said cylinder, said piston having a passage providing for the transfer of fluid from one side of the piston to the other; an oscillatable lever within the fluid chamber for operating the piston; a valve in the piston adapted to control the flow of fluid through the piston passage, said valve comprising a valve pin carried by the piston and a valve slidably supported on said valve pin and normally yieldably maintained in piston passage closing position; a link connecting the piston with the oscillatable lever, said link comprising a U-shaped member having two substantially parallel arms and a connecting web portion apertured to fit loosely about the valve pin, the ends of the arms being anchored to the free end of the oscillatable lever; and a compression spring surrounding the valve pin and interposed between the web portion of the connecting link and the piston.

9. A shock absorber comprising in combination, a casing presenting a fluid chamber and a cylinder; a piston in said cylinder; a wear-piece on said piston of comparatively harder material than said piston; an oscillatable lever within the fluid chamber, adapted to engage with the wear piece of the piston; a link connecting the piston with the oscillatable lever; and a resilient member interposed between the link and piston and adapted yieldably to maintain engagement between the oscillatable lever and piston wear piece during the movement of said piston in one direction by the oscillatable lever.

10. A shock absorber comprising in combination, a casing presenting a fluid chamber and a cylinder; a piston in said cylinder; a wear piece on said piston of comparatively harder material than said piston; an oscillatable lever within the fluid chamber, adapted to engage with the wear piece of the piston; a link connecting the piston with the oscillatable lever; and a spring interposed between the link and piston and adapted yieldably to maintain engagement between the oscillatable lever and piston wear piece during the movement of said piston in one direction by the oscillatable lever.

11. A shock absorber comprising in combination, a casing presenting a fluid chamber and a cylinder; a piston in said cylinder, having a head portion provided with a through passage substantially coaxial of the piston; a wear piece on the piston, comprising a shank portion fitting into the through passage, and a head portion engaging the outer surface of the piston head; a valve pin fitting into the through passage of the piston head; an oscillatable lever within the fluid chamber, adapted to engage the wear piece; a link anchored at one end to the oscillatable lever and having its other end slidably engaging the valve pin; and a coil spring about said valve pin, and interposed between the piston and link, yieldably to maintain the piston wear piece in engagement with the oscillatable lever during the movement of said piston in one direction by said lever.

12. A shock absorber comprising, in combination, a casing having a cylinder; a piston in said cylinder, having a passage providing for the transfer of fluid from one side of the piston to the other; means for operating the piston; means for controlling the flow of fluid through said piston passage; a stationary abutment normally engaged by one end of the said fluid flow controlling means; and means yieldably urging said controlling means against the said abutment.

13. A shock absorber comprising, in combination, a casing having a cylindrical portion; a piston reciprocable in said cylindrical portion, said piston having a passage providing for the transfer of fluid from one side of the piston to the other; and means for controlling the flow of fluid through said piston passage, said means being movable out of normal position, laterally, and longitudinally in one direction only.

14. A shock absorber comprising, in combination, a casing having a cylindrical portion; a piston reciprocable in said cylindrical portion, said piston having a passage providing for the transfer of fluid from one side of the piston to the other; and means for controlling the flow of fluid through said piston passage, said means being movable out of normal position, laterally, and longitudinally in a direction only, corresponding to the direction of movement of the piston on its work stroke.

15. A shock absorber comprising, in combination, a casing having a cylinder; a piston in said cylinder, having a passage providing for the transfer of fluid from one side of the piston to the other; means for operating the piston; means for controlling the flow of fluid through said piston passage; a stationary abutment normally engaged by one end of the said fluid flow controlling means; and a spring urging said controlling means against the said abutment.

16. A shock absorber comprising, in combination, a casing having a cylinder; a piston in said cylinder, having a passage providing for the transfer of fluid from one side of the piston to the other; means for operating the piston; means for controlling the flow of fluid through said piston passage; a stationary abutment normally engaged by one end of the said fluid flow controlling means; and a spring carried in a recess in the other end of the controlling means for yieldably urging said means against the abutment.

17. A shock absorber comprising, in combination, a casing having a cylinder; a piston in said cylinder; having a passage providing for the transfer of fluid from one side of the piston to the other; means for operating the piston; means for controlling the flow of fluid through said piston passage, said means being supported so as to be capable of lateral movement, but incapable of longitudinal movement out of normal position in a direction corresponding to the movement of the piston on its suction stroke.

18. A shock absorber comprising, in combination, a casing having a cylinder; a piston in said cylinder having passages providing for the transfer of fluid from one side of the piston to the other; means for operating the piston; means for establishing a flow of fluid through one of said piston passages only when the piston is moved in the one direction; means for restricting the flow of fluid through the other piston passage; and means for supporting said fluid flow restricting means whereby it is capable of lateral movement, but immovable longitudinally out of normal position in the direction corresponding to the movement of the piston on its suction stroke.

19. A shock absorber comprising, in combination, a casing having a fluid reservoir and a closed end cylinder; a piston in said cylinder forming a compression chamber therein; means for operating the piston; means provided by the piston for establishing a flow of fluid from the fluid reservoir into the compression chamber during the movement of said piston on its suction stroke; means cooperating with the piston for establishing a restricted flow of fluid from the compression chamber into the fluid reservoir in response to the movement of the piston on its work stroke, said means comprising a metering pin extending through a passage in the piston and supported within the casing so as to be movable laterally, but immovable longitudinally out of normal position in a direction corresponding to the suction stroke of the piston.

20. A shock absorber comprising, in combination, a casing having a cylinder; a cover for the casing; a piston in said cylinder, having a passage providing for the transfer of fluid from one side of the piston to the other; means for operating the piston; means for controlling the flow of fluid through said piston passage; a stationary abutment provided by the cover of the casing, engaged by one end of said fluid flow controlling means; and means yieldably urging said controlling means against the abutment.

21. A shock absorber comprising, in combination, a casing having a cylinder; a cover for the casing; a piston in said cylinder, having a passage providing for the transfer of fluid from one side of the piston to the other; means for operating the piston; means for controlling the flow of fluid through said piston passage; one end of said means being in engagement with the cover of the casing; and a spring at the other end of said means yieldably urging said means into engagement with said cover.

22. A device for cushioning the approaching and separating movements of two relatively movable members comprising, in combination, a casing adapted to be attached to one of said members, and having two cylinders; a piston in each of said cylinders, each piston having passages providing for the transfer of fluid from one side of the respective pistons to the other; a rocker arm operatively connected to the other relatively movable member and to the piston; means carried by each piston for establishing a substantially unrestricted flow of fluid through a passage of the respective pistons into the relative cylinder chamber in response to the movement of the respective pistons in one direction only; means in each cylinder, extending through the other passage of the respective pistons for controlling the flow of fluid from the respective cylinder chambers through said other piston passages in response to the movement of the pistons in the other direction; abutments normally engaged by one end of said last mentioned means; and springs at the other end of each of said means yieldably urging said means into engagement with the abutments.

23. A device for cushioning the approaching and separating movements of two relatively movable members comprising, in combination, a casing adapted to be attached to one of said members, and having two cylinders; a piston in each of said cylinders, each piston having passages providing for the transfer of fluid from one side of the respective pistons to the other; a rocker arm operatively connected to the other relatively movable member and to the pistons; means carried by each piston for establishing a substantially unrestricted flow of fluid through a passage of the respective pistons into the relative cylinder chamber in response to the movement of the respective pistons in one direction only; means in each cylinder, extending through the other passage of the respective pistons for controlling the flow of fluid from the respective cylinder chambers through said other piston passages in response to the movement of the pistons in the other direction; abutments normally engaged by one end of said last mentioned means; and springs at the other end of each of said means yieldably urging said means into engagement with the abutments; and means provided in each cylinder for establishing an additional flow of fluid from the respective cylinder chambers, when the fluid pressure within said chambers exceeds a predetermined value.

24. A device for cushioning the approaching and separating movements of two relatively movable members comprising, in combination, a casing adapted to be attached to one of said members, said casing providing a fluid reservoir and two cylinders closed at one end; a cover for the casing; a piston in each cylinder providing compression chambers in the respective cylinders, said pistons each having two passages providing for the transfer of fluid from one side of the piston to the other; a rocker arm operatively connected to the other relatively movable member and to the respective pistons; a valve supported on each piston for closing one of the passages in the piston during the compression stroke of the respective piston, said valve establishing a substantially free flow of fluid from the fluid chamber into the respective compression chambers when the respective pistons are operated through their suction strokes; a metering pin in each cylinder, extending through the other passage of the respective pistons and normally engaging the cover, said metering pins being adapted to establish a restricted flow of fluid from the respective compression chambers into the fluid reservoir in response to the movements of the respective pistons through their compression strokes; a spring provided on each metering pin yieldably urging the pin into engagement with the cover; and a check-valve in each compression chamber, adapted to establish an additional flow of fluid from the respective compression chambers into the fluid reservoir when the fluid pressures within said chambers exceed a predetermined value.

25. A shock absorber for cushioning the movements of two relatively movable members comprising, a casing adapted to be attached to one of said members and presenting cylinders; a piston in each cylinder; a rocker arm operatively connected to the other relatively movable member; means attached to the rocker arm, having provisions for yieldably urging the pistons into engagement with said rocker arm; means provided on each piston for establishing a free flow of fluid into the cylinders in response to the movement of the respective pistons in one direction; means for establishing a restricted flow of fluid from each cylinder in response to the movement of the respective pistons in the other direction; and separate means communicating with each cylinder for establishing a restricted flow of fluid from the respective cylinder in response to a predetermined fluid pressure when the respective pistons move in said other direction.

26. A shock absorber for cushioning the movements of two relatively movable members comprising, a casing adapted to be attached to one of said members and presenting cylinders; a piston in each cylinder; a rocker arm operatively connected to the other relatively movable member; means attached to the rocker arm, having provisions for yieldably urging the pistons into engagement with said rocker arm; means provided on each piston for establishing a free flow of fluid into the cylinders in response to the movement of the respective pistons in one direction; means movable laterally, but immovable longitudinally out of normal position in a direction corresponding to the movement of the respective piston in its said, one direction, for establishing a restricted flow of fluid from each cylinder in response to the movement of the respective pistons in the other direction; and separate means communicating with each cylinder for establishing a restricted flow of fluid from the respective cylinder in response to a predetermined fluid pressure when the respective pistons move in said other direction.

27. A shock absorber for cushioning the movements of two relatively movable members comprising, a casing adapted to be attached to one of said members and presenting cylinders; a piston in each cylinder; a rocker arm operatively connected to the other relatively movable member; means attached to the rocker arm, having provisions for yieldably urging the pistons into engagement with said rocker arm; means provided on each piston for establishing a free flow of fluid into the cylinders in response to the movement of the respective pistons in one direction; recessed metering pins adapted to cooperate with the respective pistons for establishing a restricted flow of fluid from each cylinder in response to the movement of the respective pistons in the other direction; and a spring loaded, pressure release valve communicating with each cylinder for establishing a restricted flow of fluid from the respective cylinder in response to a predetermined fluid pressure when the respective pistons move in said other direction.

28. A shock absorber comprising, in combination, a casing presenting a pair of cylinders; a piston in each cylinder; a head-piece of wear resisting material on each piston; a rocker-shaft journalled in the casing; a rocker-lever carried on the rocker-shaft and having an arm extending on opposite sides of the shaft; a wear-piece of wear resisting material secured to each arm of the rocker-lever; a link pivotally attached to each arm of the rocker-lever; a resilient element interposed between each piston and its respective rocker-lever link whereby the respective pistons are urged to cause their head-pieces yieldably to engage the wear-pieces of their respective rocker-lever arms.

29. A shock absorber comprising, in combination, a casing presenting a pair of cylinders; a piston in each cylinder; a head-piece of wear resisting material on each piston; a rocker-shaft journalled in the casing; a rocker-lever carried on the rocker-shaft and having an arm extending on opposite sides of the shaft; a wear-piece of wear-resisting material secured to each arm of the rocker-lever; a link pivotally attached to each arm of the rocker-lever; a resilient element interposed between each piston and its respective rocker-lever link whereby the respective pistons are urged to cause their head-pieces yieldably to engage the wear-pieces of their respective rocker-lever arms; and a covering of lubricating, substantially wear-resisting metal on the head-pieces of the pistons and the wear-pieces of the rocker-lever.

30. A shock absorber comprising, in combination, a casing presenting a pair of cylinders; a piston in each cylinder; a head-piece of wear resisting material on each piston; a rocker-shaft journalled in the casing; a rocker-lever carried on the rocker-shaft and having an arm extending on opposite sides of the shaft; a wear-piece of wear-resisting material secured to each arm of the rocker-lever; a link pivotally attached to each arm of the rocker-lever; a resilient element interposed between each piston and its respective rocker-lever link whereby the respective pistons are urged to cause their head-pieces yieldably to engage the wear-pieces of their respective rocker-lever arms; and a covering of copper on both the head-pieces and wear-pieces of the pistons and rocker-lever respectively.

In testimony whereof we hereto affix our signatures.

WILLIAM A. CHRYST.
GEORGE W. ELSEY.